United States Patent [19]

Gunkel

[11] Patent Number: 5,367,831
[45] Date of Patent: Nov. 29, 1994

[54] FLUSH MOUNT MAGNETIC HEADER SEAL
[75] Inventor: Michael D. Gunkel, Toledo, Ohio
[73] Assignee: The Standard Products Company, Cleveland, Ohio
[21] Appl. No.: 120,594
[22] Filed: Sep. 13, 1993
[51] Int. Cl.⁵ ............................................. E06B 7/16
[52] U.S. Cl. .................. 49/478.1; 49/484.1; 49/498.1; 49/475.1
[58] Field of Search ............. 49/478.1, 475.1, 490.1, 49/484.1, 498.1, 495.1, 493.1, 496.1, 440, 441

[56] References Cited

U.S. PATENT DOCUMENTS

| 626,513 | 8/1961 | Frehse | 49/498.1 |
|---|---|---|---|
| 3,408,772 | 11/1968 | Frehse | 49/478.1 X |
| 3,882,637 | 5/1975 | Lindenschmidt | 49/478.1 X |
| 4,192,101 | 3/1980 | White | |
| 4,381,115 | 4/1983 | Ko | 49/498.1 X |
| 4,490,942 | 1/1985 | Arnheim et al. | |
| 4,535,563 | 8/1985 | Mesnel | |
| 4,592,180 | 6/1986 | Gerritsen | |
| 4,945,681 | 8/1990 | Nozaki et al. | 49/498.1 X |
| 4,999,951 | 3/1991 | Keys et al. | |
| 5,261,188 | 11/1993 | Vaughan | 49/498.1 X |

FOREIGN PATENT DOCUMENTS 2582043  11/1986  France ................. 49/478.1

Primary Examiner—Peter M. Cuomo
Assistant Examiner—Jerry Redman
Attorney, Agent, or Firm—Harness, Dickey & Pierce

[57] ABSTRACT

A magnetic header seal assembly for an automotive vehicle header comprises a first sealing element mounted to the vehicle door frame having a compressible body portion with an integrally attached magnetic element and a second complementary sealing element mounted on the vehicle door flange. The first and second sealing elements cooperate to form a seal along both the window panel and the header line of the vehicle.

9 Claims, 1 Drawing Sheet

U.S. Patent    Nov. 29, 1994    5,367,831
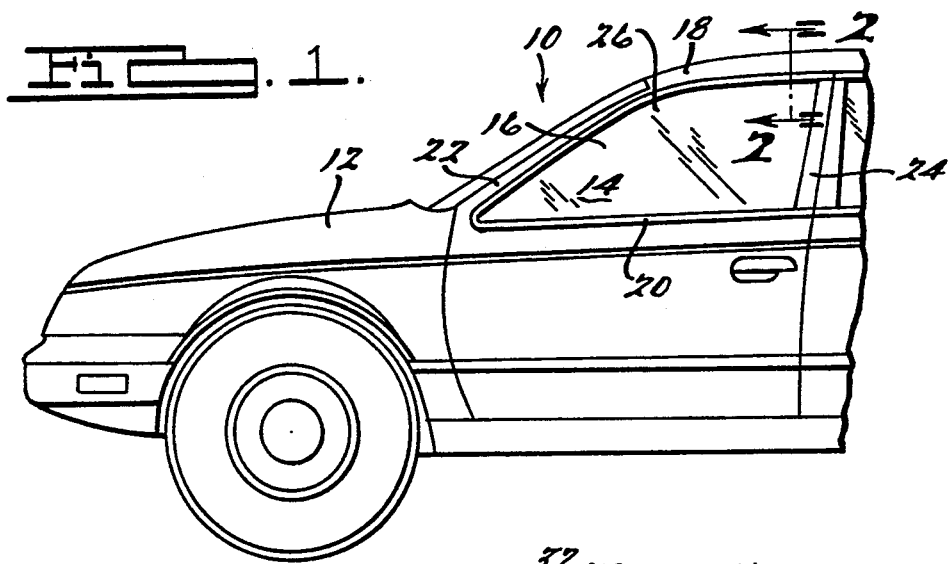
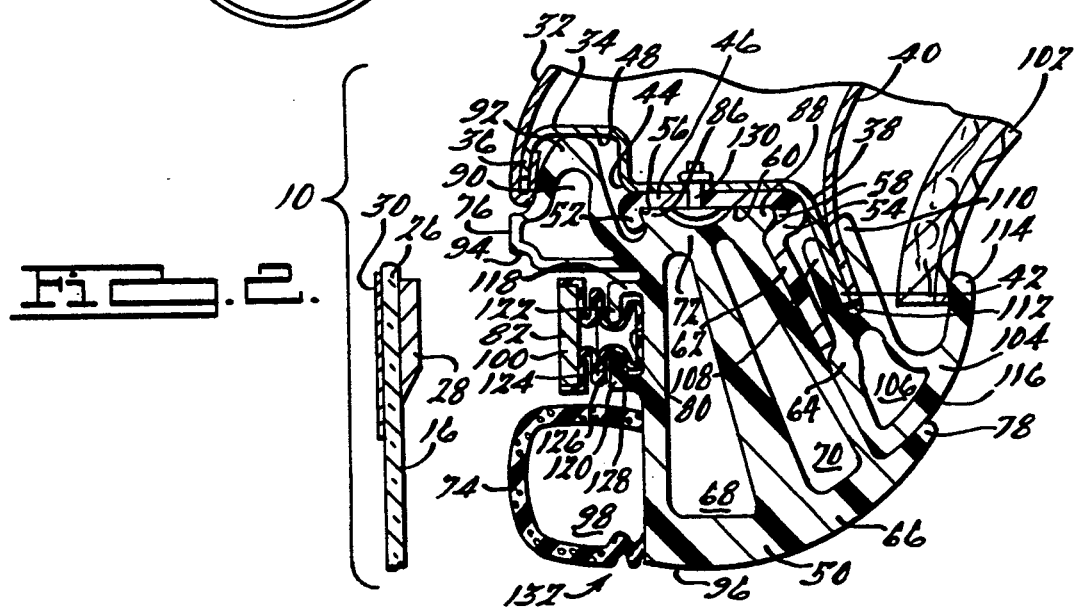
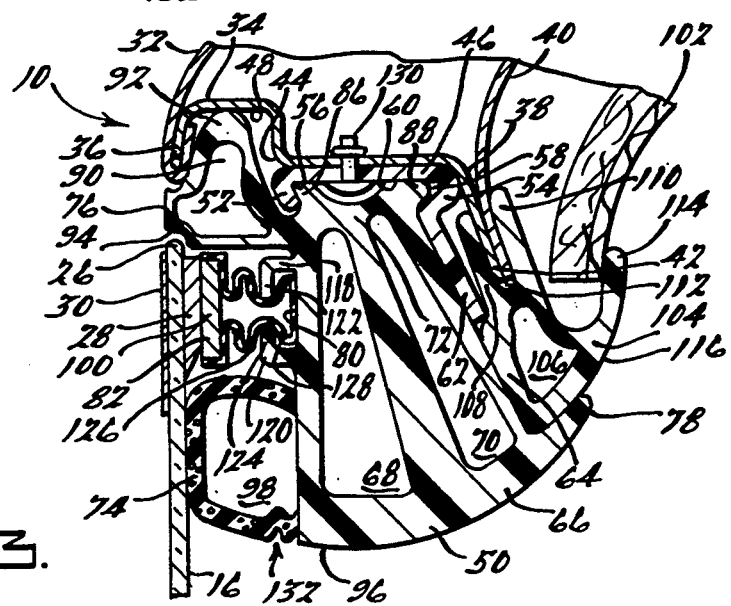

5,367,831

FLUSH MOUNT MAGNETIC HEADER SEAL

BACKGROUND OF THE INVENTION

The present invention relates generally to seals for movable window panes in automotive vehicles. More particularly, the present invention relates to a window seal assembly having a magnetic seal which cooperates with a movable window pane having a corresponding magnetic element, wherein the window seal assembly is capable of having the top and side edge flush with the adjacent vehicle body panel.

In recent years there has been much interest in aerodynamically designed automotive vehicles having window panes wherein the window pane edges are substantially flush with the vehicle body. One such system is described in the U.S. Pat. No. 4,535,563 entitled "Window Seal" which issued to Mensel on Aug. 20, 1985.

One problem with such magnetic window seals is that the sealing provided along the header line of the vehicle is inadequate. Worse yet, many of the magnetic window seals fail to provide for sealing along the header line all together.

It is therefore the primary object of the present invention to provide a magnetic seal assembly which provides excellent sealing characteristics along both header line and along the top and lateral edges of the window pane.

SUMMARY OF THE INVENTION

The magnetic window seal assembly of the present invention comprises a first elongated flexible strip which is mounted to the vehicle body and which has a compressible body portion with a first magnetic element partially embedded therein. The complimentary second magnetic element is provided along the top, and under certain embodiments, the lateral edges of the window being sealed. When the window pane is in sealing engagement with the vehicle door a flexible sealing bulb is disposed against the inner surface of the window pane. A second elongated sealing strip which is mounted to the vehicle body along an extending flange, cooperates with the first elongated strip to seal the header line of the vehicle.

The window seal assembly of the present invention thus includes a first magnetic element attached to or embedded in the first sealing strip and a complimentary second magnetic element attached to or embedded in the lateral free edge portion of the window pane. By complimentary is meant that the first and second magnetic elements will form a magnetic bond when adjacently positioned. When the vehicle door is closed and the window pane in the ascended position, a magnetic seal is formed between the window and the vehicle body by the magnetic attractive forces between the first and second magnetic elements of the window seal assembly. When the window pane is fully ascended the sealing bulb of the first sealing strip is engaged by the inner surface of the window pane to provide a seal against undesirable elements.

Thus, according to one aspect, the window seal assembly of the present invention provides a satisfactory seal for the window system having a movable window pane.

Another aspect is that the window seal assembly of the present invention provides a sealing assembly forming a complete seal along the header line of the vehicle.

Still another aspect is that the window seal assembly of the present invention provides a magnetic seal in which the sealing force does not depend entirely upon compression of the sealing bulb.

These and other advantages of the present invention will be understood from the following description of the preferred embodiments taken in conjunction with the drawings and appended claims.

BRIEF DESCRIPTION OF THE DRAWINGS

FIG. 1 a partial side view of an automotive vehicle having a window sealing system with a movable window pane shown in the fully ascended position.

FIG. 2 is a cross-sectional view, illustrating the window pane and sealing assembly disengaged.

FIG. 3 is a cross-sectional view, broken away, taken along line 3—3 of FIG. 1 illustrating a preferred embodiment of the magnetic window seal assembly of the present invention.

DETAILED DESCRIPTION OF THE PREFERRED EMBODIMENT

Referring to FIG. 1, an automotive vehicle 10 is shown at reference numeral 12. The automotive vehicle 12 includes a window opening 14 for a vehicle door window panel 16. Window opening 14 is generally defined by roofline 18, beltline 20, forward pillar 22 and rearward pillar 24. When the window panel 16 is in the ascended position, i.e. the window opening is closed, the window seal assembly 10 sealingly engages the top edge 26 of the window panel 16. While the present invention is intended particularly for sealing along the top edge 26 of the window panel it should be noted that the present invention may also be utilized along the rear pillar and possibly the front pillar.

Turning now to FIG. 2, which is a partial cross-sectional view taken along line 2—2 of FIG. 1, the window seal assembly 10 of the present invention is shown prior to engagement with the top edge 26 of the window panel 16. As shown in FIG. 2, the door frame 32 includes an incurved end which receives a first end 36 of sheet panel 34. Along a second end 38, the sheet panel 34 is pinch welded to a second sheet panel 40 thereby forming flange 42. Secured adjacent to the exposed surface 44 of sheet panel 34 is bracket 46 for securably retaining the first sealing element 50. The bracket 46 can be secured to the panel 34 by fasteners 130 as demonstrated, through the use of adhesives or by a combination of fasteners and adhesives. The sheet panel 34 includes a recessed area 48 located proximate to the door frame 32 for receiving the positive stop portion of sealing element 50.

The bracket member 46 is provided with downwardly extending somewhat incurved end portions 52 and 54, respectively, which provide locking spaces 56 and 58 along the inner surface 60 of the bracket member 46. Extending from the end 54 of the bracket member 46 is a leg 62 which separates portions of the first and second sealing elements 50 and 64.

The sealing element 50 includes a body 66 having openings 68 and 70 therethrough, an anchor portion 72, a sealing bulb 74, a positive stop 76, a sealing lip 78 and a channel 80 for hosting a magnet 82. The body 66 is formed by extruding a relatively dense material such as EPDM rubber having a hardness of approximately 75 shore A durometer. The anchor portion 72 which is secured along the inner surface 60 of the bracket member 46 is provided with tabs 86 and 88 which extend into the locking spaces 56 and 58, respectively, to assist in securing the first sealing element 50 to the vehicle 12.

Extending from the body portion 66 near the anchor portion 72 in the direction of the first end 36 of the sheet panel 34 is a positive stop 76 for absorbing the impact upon full closure of the window panel 16. The positive stop 76 includes a central opening 90 which allows for compression, a rounded portion 92 which extends into and against the walls of the recessed area 48 and a groove 94 for receiving the top edge 26 of the window panel 16.

Extending along the base 96 of the body portion 66 in the direction of the window opening 14 is a compressible sealing bulb 74. The sealing bulb 74 is generally co-extruded along with the material of the body portion 66 and is formed from a less dense sponge-like material. Typically, the sealing bulb 74 is formed from an elastomeric material such as EPDM rubber having a shore A durometer hardness of between about 20 and 40, which allows the bulb to be compressed upon engagement by the window panel 16. The sealing bulb 74 is provided with a detent 132 located along the base and an aperture 98 extending therethrough which accommodates the flexure of the sealing bulb 74. Optionally, the sealing bulb 74 can be provided with flocking (not shown) to reduce friction on the sealing bulb 74.

The sealing lip 78 extends along the base 96 of the body portion 66 away from the window opening 14 and in the direction of the header line 116. Ideally, the sealing lip 78 is sufficiently long to extend contiguously under a portion of the second sealing element 64.

The channel 80 which assists in retaining the magnet 82 includes first and second arms 118 and 120 which extend from the body portion 66. The arms 118 and 120 are provided with incurved ends 122 and 124, respectively, which extend in the direction of the other arm to form the channel 80.

The magnet 82 is typically formed by separately co-extruded a slightly expandable body 126 which includes a base 128 which is partially embedded within the channel 80. The base has sufficient width and depth to substantially fill the channel 80 and engage the arms 118 and 120 to preclude detachment from the first sealing element. A magnet element 100 is then inserted and adhered or otherwise attached to the body 128 to form the magnet 82. Preferably, the body 126 is made from extruded tetrapolyethylene (TPE) and the magnetic element 100 is made from a magnetically chargeable metallic material such as barium ferrite, among others. Optionally, the magnetic element 100 can be replaced with an electro-magnet (not shown).

The second sealing element 64 which cooperatively mates with the first sealing element 50 includes a body portion 104 having an opening 106 therethrough, first and second spaced apart legs 108 and 110 which form a U-shaped channel 112 and a sealing lip 114 which extends along the base 116 of sealing element 64. The second sealing element 64 is typically formed by extruding an elastomeric material such as EPDM rubber having a shore A durometer hardness of approximately 75. The sealing element 64 is extruded such that the U-shaped channel 112 is mounted on the flange 42 and the sealing lip 114 engages the header line 102 of the vehicle 12. As noted, the sealing lip 78 of the first sealing element 50 extends contiguously under the second sealing element 64. This arrangement serves to assist in maintaining the second sealing element 64 on the flange 42.

With reference to FIG. 3 the operational aspects according to the teachings of the present invention will now be described in greater detail. As demonstrated in FIG. 3, as the window panel 16 is advanced to close the window opening 14 the magnet 82 attracts the oppositely charged magnet 28 adhered along the top edge 26 to the window panel 16. The magnet 82 draws the top edge of the window panel 16 inwardly toward the body 66 of the sealing element 50 such that the window panel 16 engages the sealing bulb 74 and causes it to compress. Upon full closure of the window opening the top edge 26 of the window panel 16 seats proximate to the groove 94 contained on the positive stop 76. Optionally, a decorative strip 30 can be provided on the outer surface of the window panel 16 along the top edge 26 to block the view of the magnets 28 and 82 upon closure of the window opening 14.

It should be understood by those skilled in the art that the embodiments just described compensate for any misalignment of the window panel 16 occurring during guidance of the top edge of the window panel. It should also be noted that other embodiments while not specifically described are considered to be within the scope of the present invention. In particular, it is contemplated that electromagnetic means could be used in place of one or both of the magnetic elements. Further, as previously noted the window seal assembly may have other applications such as along the forward and rearward pillars.

The invention has been described in an illustrative manner, and it is to be understood that the terminology which has been used is intended to describe the invention in a non-limiting manner. The invention as described therefore constitutes the preferred embodiments of the present invention, and it should be appreciated that the invention is susceptible to modification, variation and change without departing from the proper scope and fair meaning of the accompanying claims.

What is claimed is:

1. A window seal for a vehicle door including a frame and a closeable window panel, said window panel including an inner surface having a magnet disposed thereon along at least one edge, said window seal comprising:
   a first sealing element mounted to the vehicle door frame, said first sealing element including a body having a compressible sealing bulb and a sealing lip disposed along the base portion of the body, a magnet integrally attached to said body and stop means for limiting the closure of said window panel; and
   a second sealing element mounted to the vehicle door frame, said second sealing element including a body having extending means for attachment to said vehicle door frame and a sealing lip for engaging a header line of said vehicle door frame.

2. The window seal of claim 1, wherein the body of said first sealing element is made from an elastomeric material having a density greater than that of said sealing bulb.

3. The window seal of claim 1, wherein the sealing bulb and the sealing lip of said first sealing element extend along opposite ends of said base portion.

4. The window seal of claim 3, wherein said sealing bulb includes means for accommodating compression of the sealing bulb.

5. The window seal of claim 4, wherein said means for accommodating the compression of the sealing bulb includes an aperture extending therethrough.

6. The window seal of claim 5, wherein said means for accommodating the compression of the sealing bulb further includes a detent located along the base of the sealing bulb.

7. The window seal of claim 1, wherein the magnet which is integrally attached to the body of said first sealing element includes an expandable body.

8. The window seal of claim 1, wherein the extending means for attachment of said second sealing element to said vehicle door frame includes first and second legs defining a U-shaped channel.

9. The window seal of claim 1, wherein the sealing lip of said first sealing element contiguously engages a portion of said second sealing element to assist in maintaining the second sealing element on the vehicle door flange.

* * * * *